(12) United States Patent
Luo et al.

(10) Patent No.: US 12,111,697 B2
(45) Date of Patent: Oct. 8, 2024

(54) DISPLAY APPARATUS

(71) Applicant: BOE TECHNOLOGY GROUP CO., LTD., Beijing (CN)

(72) Inventors: Xiaofei Luo, Beijing (CN); Shangchieh Chu, Beijing (CN); Yanyan Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 210 days.

(21) Appl. No.: 17/781,091

(22) PCT Filed: May 13, 2021

(86) PCT No.: PCT/CN2021/093504
§ 371 (c)(1),
(2) Date: May 31, 2022

(87) PCT Pub. No.: WO2021/258899
PCT Pub. Date: Dec. 30, 2021

(65) Prior Publication Data
US 2023/0004189 A1    Jan. 5, 2023

(30) Foreign Application Priority Data
Jun. 22, 2020   (CN) .......................... 202021168849.7

(51) Int. Cl.
*G06F 1/16* (2006.01)

(52) U.S. Cl.
CPC .......... *G06F 1/1652* (2013.01); *G06F 1/1656* (2013.01)

(58) Field of Classification Search
CPC ....... G06F 1/1652; G06F 1/1656; G09F 9/301
See application file for complete search history.

(56) References Cited

U.S. PATENT DOCUMENTS

| | | | |
|---|---|---|---|
| 9,685,100 B2 * | 6/2017 | Choi | ...................... G09F 9/301 |
| 9,860,353 B2 * | 1/2018 | Lee | ..................... H04M 1/0268 |
| 10,582,628 B2 * | 3/2020 | Kim | ...................... B21B 39/008 |
| 11,862,048 B2 * | 1/2024 | Li | ............................ G09F 9/301 |
| 2016/0054758 A1 | 2/2016 | Han | |

(Continued)

FOREIGN PATENT DOCUMENTS

| CN | 110211501 A | 9/2019 |
|---|---|---|
| CN | 110494909 A | 11/2019 |

(Continued)

*Primary Examiner* — Rockshana D Chowdhury
(74) *Attorney, Agent, or Firm* — IP & T GROUP LLP

(57) ABSTRACT

A display apparatus includes a first housing provided with an opening therein, a first reel rotatably disposed in the first housing, a second reel rotatably disposed in the first housing, a flexible display panel, and a flexible support plate. The second reel and the first reel are arranged at intervals and extend in a same direction. A first end of the flexible display panel is connected to the first reel and wound on the first reel, and a first end of the flexible support plate is connected to the second reel and wound on the second reel. The flexible display panel and the flexible support plate are configured such that when the flexible display panel and the flexible support plate extend out of the first housing through the opening, the flexible support plate is capable of gradually attaching to the first housing to support the flexible display panel.

20 Claims, 10 Drawing Sheets

(56) References Cited

U.S. PATENT DOCUMENTS

| | | | |
|---|---|---|---|
| 2016/0161983 A1* | 6/2016 | Lee | G06F 1/1652 361/749 |
| 2016/0165717 A1* | 6/2016 | Lee | H05K 1/028 361/749 |
| 2019/0174644 A1 | 6/2019 | Kim et al. | |
| 2019/0204874 A1* | 7/2019 | Kim | G06F 1/1643 |
| 2020/0043386 A1 | 2/2020 | Kim | |

FOREIGN PATENT DOCUMENTS

| | | |
|---|---|---|
| CN | 209928860 U | 1/2020 |
| CN | 110782787 A | 2/2020 |
| CN | 111243440 A | 6/2020 |
| CN | 212659253 U | 3/2021 |

\* cited by examiner

DISPLAY APPARATUS

CROSS-REFERENCE TO RELATED APPLICATIONS

The present disclosure is a national phase entry under 35 USC 371 of International Patent Application No. PCT/CN2021/093504, filed on May 13, 2021, which claims priority to Chinese Patent Application No. 202021168849.7, filed on Jun. 22, 2020, which are incorporated herein by reference in their entirety.

TECHNICAL FIELD

The present disclosure relates to the field of display technologies, and in particular, to a display apparatus.

BACKGROUND

In recent years, the development of flexible display technologies has greatly promoted the development of display technologies to be more portable and diversified in future. A roll-up flexible display apparatus is capable of rolling and storing a flexible display screen, which may save space to a great extent and may be convenient for users to carry, so it has become one of the hot spots in the development of display technology in the future.

SUMMARY

Some embodiments of the present disclosure provide a display apparatus including a first housing, a first reel, a second reel, a flexible display panel and a flexible support plate. The first housing is provided with an opening therein; the first reel is rotatably disposed in the first housing, and the second reel is rotatably disposed in the first housing; the second reel and the first reel are arranged at intervals, and extending in a same direction; a first end of the flexible display panel is connected to the first reel and wound on the first reel; a first end of the flexible support plate is connected to the second reel and wound on the second reel. The flexible display panel and the flexible support plate are configured such that when the flexible display panel and the flexible support plate extend out of the first housing through the opening, the flexible support plate is capable of gradually attaching to the first housing to support the flexible display panel.

In some embodiments, the first housing includes a first housing wall, and the opening is disposed in the first housing wall. The second reel is disposed between the first housing wall and the first reel, or the first reel is disposed between the first housing wall and the second reel. An extending direction of the flexible support plate from the second reel to outside of the first housing is parallel to an extending direction of the flexible display panel from the first reel to the outside of the first housing, and a portion of the flexible support plate extending out of the second reel is attached to a portion of the flexible display panel extending out of the first reel.

In some embodiments, the display device further includes a first limiting member and a second limiting member that are disposed in the first housing; the first limiting member and the second limiting member have a first gap therebetween. The flexible display panel and the flexible support plate pass through the first gap, and a width of the first gap is less than or equal to a sum of thicknesses of the flexible display panel and the flexible support plate.

In some embodiments, the first limiting member is a first limiting roller, the second limiting member is a second limiting roller, and the first limiting roller and the second limiting roller extend in a same direction and are both rotatably arranged in the first housing.

In some embodiments, the display device further includes a third limiting member disposed in the first housing, and the third limiting member and the second reel have a second gap therebetween. The flexible display panel and the flexible support plate pass through the second gap, and a width of the second gap is less than or equal to a sum of thicknesses of the flexible display panel and the flexible support plate.

In some embodiments, the third limiting member is a third limiting roller, and the third limiting roller is rotatably arranged in the first housing, and the third limiting roller and the second reel extend in a same direction.

In some embodiments, the display apparatus further includes a first spring and a second spring. The first spring is in a spiral shape and is arranged around the first reel, an end of the first spring is connected to the first reel, and another end of the first spring is connected to the first housing; the first spring is configured such that when the first reel rotates in a first rotation direction, the first spring is tightened to apply a first restoring force for driving the first reel to rotate in a second rotation direction to the first reel. The first rotation direction is a rotation direction of the first reel when the flexible display panel extends out of the first housing through the opening, and the second rotation direction is opposite to the first rotation direction. The second spring is in a spiral shape and is arranged around the second reel, an end of the second spring is connected to the second reel, and another end of the second spring is connected to the first housing; the second spring is configured such that when the second reel rotates in a third rotation direction, the second spring is tightened up to apply a second restoring force for driving the second reel to rotate in a fourth rotation direction to the second reel. The third rotation direction is a rotation direction of the second reel when the flexible support plate extends out of the first housing through the opening, and the fourth rotation direction is opposite to the third rotation direction.

In some embodiments, the display apparatus further includes a second housing and a display driver, and the display driver is disposed in the second housing and configured to drive the flexible display panel to perform display. A second end of the flexible display panel and a second end of the flexible support plate are both connected to the second housing. The second end of the flexible display panel is an end of the flexible display panel extending out of the first housing, and the second end of the flexible support plate is an end of the flexible support plate extending out of the first housing.

In some embodiments, an installation slot is provided on an outer surface of a housing wall of the second housing; in a direction in which the flexible display panel extends out or retracts relative to the first housing, an end of the installation slot proximate to the first housing has an insertion opening, and another end of the installation slot away from the first housing is sealed. The second end of the flexible display panel and the second end of the flexible support plate extend into the installation slot through the insertion opening; in the installation slot, a surface of the flexible support plate is adhered to a slot wall of the installation slot, and another surface is attached to the flexible display panel.

In some embodiments, the display apparatus further includes a scissor mechanism connected between the first housing and the second housing. The scissor mechanism includes a plurality of connecting rod groups arranged in a direction in which the flexible display panel extends out or retracts relative to the first housing, each connecting rod groups includes two connecting rods whose middle portions are hinged together. In two adjacent connecting rod groups, ends of two connecting rods in one connecting rod groups proximate to another connecting rod group are hinged with ends of two connecting rods in the another connecting rod group proximate to the one connecting rod group in a one-to-one correspondence. In a connecting rod group adjacent to the first housing, ends of two connecting rods proximate to the first housing are respectively hinged with the first housing, and an end of at least one connecting rods of the two connecting rods proximate to the first housing is configured to be capable of moving relative to the first housing in a length direction of the first reek In a connecting rod group adjacent to the second housing, ends of two connecting rods proximate to the second housing are respectively hinged with the second housing, and an end of at least one connecting rods of the two connecting rods proximate to the second housing is configured to be capable of moving relative to the second housing in the length direction of the first reel.

In some embodiments, in the connecting rod group adjacent to the first housing, the end of a connecting rods of the two connecting rods proximate to the first housing is provided with a first articulated shaft thereon, and the end of another connecting rods of the two connecting rods proximate to the first housing is provided with a second articulated shaft thereon. The first housing is provided with a first sliding groove and a second sliding groove that are arranged at intervals in the length direction of the first reel therein; the first sliding groove and the second sliding groove both extend in the length direction of the first reel. The first articulated shaft extends into the first sliding groove, and is slidably engaged with the first sliding groove; the second articulated shaft extends into the second sliding groove, and is slidably engaged with the second sliding groove.

In some embodiments, in the connecting rod group adjacent to the second housing, the end of a connecting rods of the two connecting rods proximate to the second housing is provided with a third articulated shaft thereon, and the end of another connecting rods of the two connecting rods proximate to the second housing is provided with a fourth articulated shaft thereon. The second housing is provided with a third sliding groove and a fourth sliding groove that are arranged at intervals in the length direction of the first reel therein, and the third sliding groove and the fourth sliding groove both extend in the length direction of the first reel. The third articulated shaft extends into the third sliding groove, and is slidably engaged with the third sliding groove; the fourth articulated shaft extends into the fourth sliding groove, and is slidably engaged with the fourth sliding groove.

In some embodiments, the flexible support plate includes a flexible support plate body and an adhesive film adhered to a surface of the flexible support plate body. The adhesive film is configured such that when the flexible display panel and the flexible support plate extend out of the first housing through the opening, the adhesive film is capable of gradually adhering to the flexible display panel, so that the flexible support plate and the flexible display panel are attached together. Peeling force between the adhesive film and the flexible display panel is smaller than peeling force between the adhesive film and the flexible support plate body.

In some embodiments, the peeling force between the adhesive film and the flexible display panel is less than 3 g/inch.

In some embodiments, the adhesive film is an elastic film, and/or the flexible support plate body is a steel sheet.

In some embodiments, the flexible display panel includes a panel body and a flexible cover plate. A surface of the panel body facing away from a display surface thereof is configured to be attached to the flexible support plate; the flexible cover plate covers the display surface of the panel body, and an edge of the flexible cover plate exceeds an edge of the panel body in a length direction of the first reel. The flexible display panel further includes an elastic support layer, the elastic support layer is attached to an edge of the flexible cover plate, and is configured such that when the panel body is attached to the flexible support plate, the elastic support layer is located between the edge of the flexible cover plate and the flexible support plate to support the edge of the flexible cover plate.

In some embodiments, the elastic support layer is a foam layer.

In some embodiments, the first housing includes a first housing wall and a third housing wall adjacent to the first housing wall. The opening is disposed in the first housing wall, and the first reel and the second reel are arranged at intervals in a second direction. An extending direction of the flexible support plate from the second reel to outside of first housing is not parallel to an extending direction of the flexible display panel from the first reel to the outside of the first housing. A dimension of the opening in the second direction matches a sum of thicknesses of the flexible support plates and the flexible display panel.

In some embodiments, the dimension of the opening in the second direction is equal to the sum of the thicknesses of the flexible support plates and the flexible display panel.

In some embodiments, the display apparatus further includes a driving motor having an output shaft, a first gear, a second gear, a fourth gear, and a third gear. The first gear is fixedly sleeved on the output shaft of the drive motor, the second gear is fixedly sleeved on the first reel and meshing with the first gear, the fourth gear is fixedly sleeved on the second reel, and the third gear meshes between the second gear and the fourth gear.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and actual timings of signals to which the embodiments of the present disclosure relate.

DETAILED DESCRIPTION

Figure 1:
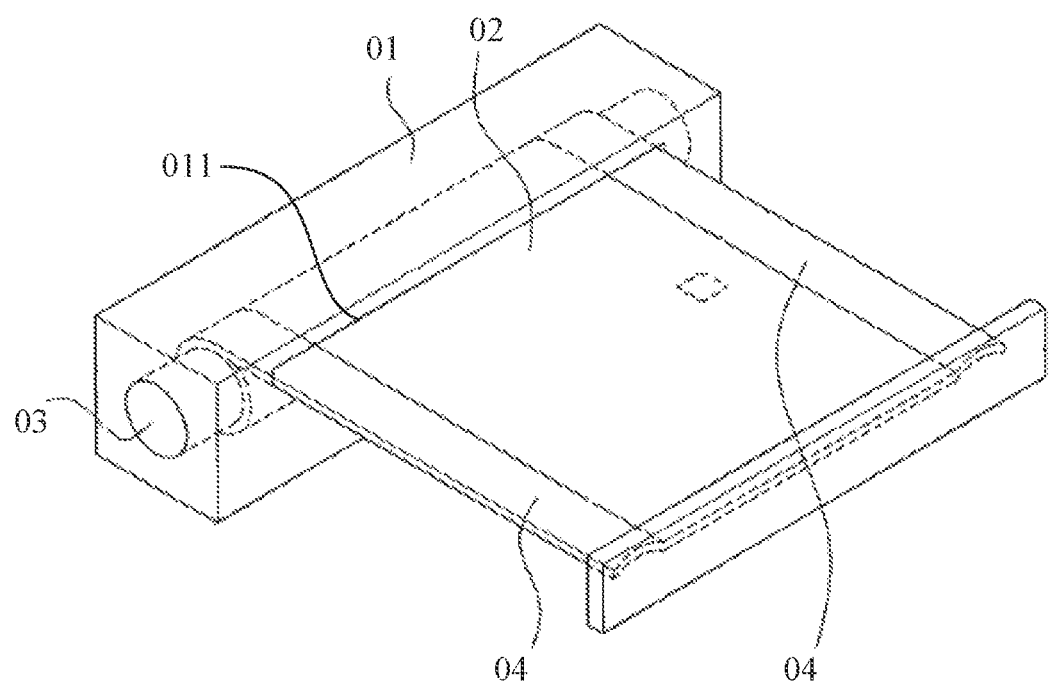
FIG. 1 is a schematic structural diagram of a display apparatus in the related art.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, terms such as "one embodiment", "some embodiments", "exemplary embodiments", "an example", "a specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or examples(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, a feature defined with "first" or "second" may explicitly or implicitly include one or more features. In the description of the embodiments of the present disclosure, the term "a plurality of or the plurality of" means two or more unless otherwise specified.

In describing some embodiments, "connected" and its derivative expressions may be used. For example, the term "connected" may be used in the description of some embodiments to indicate that two or more components are in direct physical contact or electrical contact with each other.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of the phrase "applicable to" or "configured to" herein means an open and inclusive language, which does not exclude devices that are applicable to or configured to perform additional tasks or steps.

Additionally, the use of the phase "based on" is meant to be open and inclusive, since a process, step, calculation or other action that is "based on" one or more of the stated conditions or values may, in practice, be based on additional conditions or value beyond those stated.

Exemplary embodiments are described herein with reference to sectional views and/or plan views as idealized exemplary drawings. In the accompanying drawings, thickness of layers and sizes of regions are enlarged for clarity. Thus, variations in shapes relative to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. Therefore, the regions shown in the accompanying drawings are schematic in nature, and their shapes are not intended to show actual shapes of regions in a device, and are not intended to limit the scope of the exemplary embodiments.

Currently, when a flexible display panel in a rollable display apparatus is unfolded, due to the poor recovery ability of the film material of the flexible display panel, it is easy to cause the flexible display panel to sag at two edges and to bulge at a central region in a width direction (which being perpendicular to an extension direction), which not only affects the users' visual experience, but also interferes with a housing opening of a housing to damage the two edges of the flexible display panel when the flexible display panel is rolled into the housing of the display apparatus.

The related art provides a display apparatus, as shown in FIG. 1, the display apparatus includes a housing 01, a flexible display panel 02 and a reel 03 rotatably arranged in the housing 01. The flexible display panel 02 is wound on the reel 03, and is capable of extending out of the housing 01 through an opening 011 in the housing 01. The display apparatus further includes bending adjustment rods 04, and the bending adjustment rods 04 are arranged at the two edges of the flexible display panel 02 in a width direction thereof. The bending adjustment rods 04 may be bent and maintained in a bent shape to adjust the bending curvature of the flexible display panel 02 in the length direction.

For the display apparatus in the related art, as shown in FIG. 1, the bending adjustment rods 04 may strengthen the two edges of the flexible display panel 02 to prevent the two edges from sagging when the flexible display panel 02 is unfolded. However, the bending adjustment rods 04 only strengthen the edge regions of the flexible display panel 02, and the action range is limited, and the central region of the flexible display panel 02 is easily deformed, so that the flexible display panel 02 is not flat after unfolding, which affects the user experience.

Figure 2:
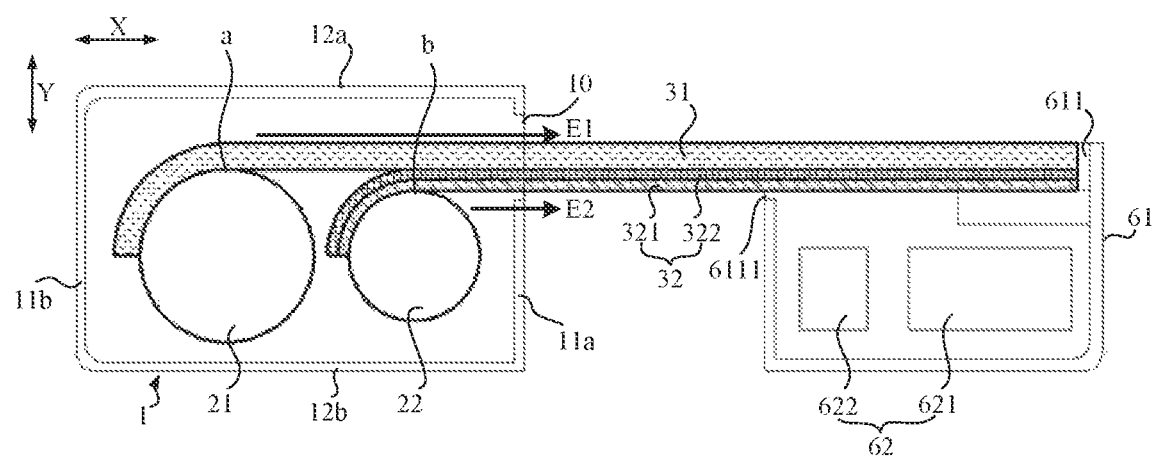
FIG. 2 is a sectional view of a flexible display panel of a display apparatus in an unfolded state, in accordance with some embodiments of the present disclosure.

Embodiments of the present disclosure provide a display apparatus. As shown in FIG. 2, by setting a flexible support plate 32, when a flexible display panel 31 is unfolded, the flexible support plate 32 and the flexible display panel 31 are attached together gradually, which not only support two edges of the flexible display panel 31, but also support a central region of the flexible display panel 31, so as to maintain the overall flatness of the flexible display panel 31 when it is unfolded.

As shown in FIG. 2, the display apparatus provided by some embodiments of the present disclosure includes a first housing 1, a first reel 21 rotatably disposed in the first housing 1, and a second reel 22 rotatably disposed in the first shell 1. The first housing 1 is provided with an opening 10 therein.

Figure 7:
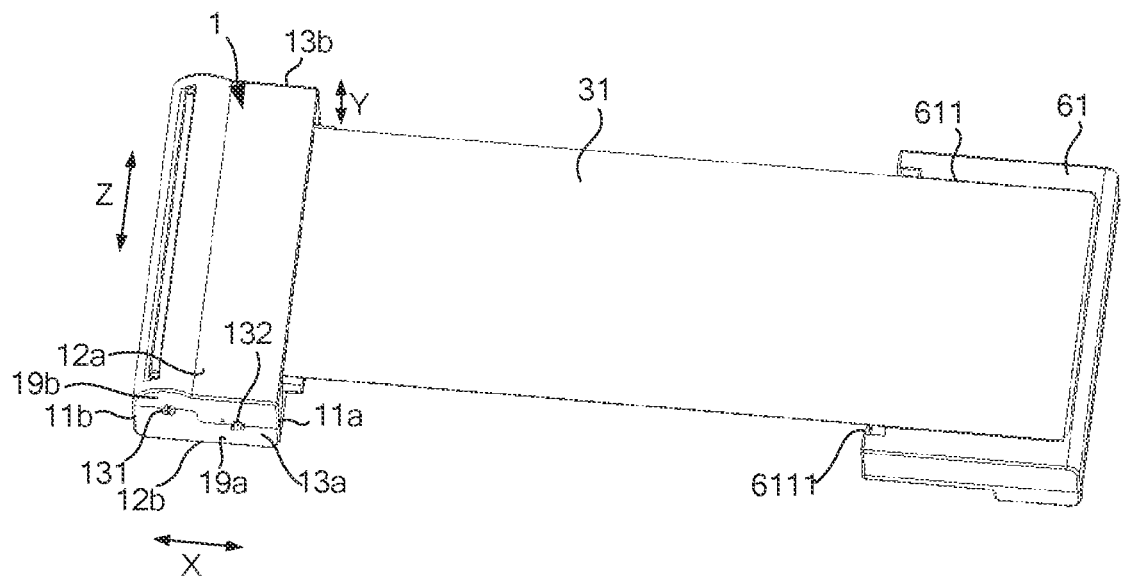
FIG. 7 is a perspective diagram of a flexible display panel of another display apparatus in an unfolded state, in accordance with some embodiments of the present disclosure.

As shown in FIGS. 2 and 7, in some embodiments, the first housing 1 includes a first housing wall 11a and a second housing wall 11b that are arranged at intervals in a first direction X, a third housing wall 12a and a fourth housing wall 12b that are arranged at intervals in a second direction Y, and a fifth housing wall 13a and a sixth housing wall 13b that are arranged at intervals in a third direction Z (as shown in FIG. 7). The first direction X, the second direction Y and the third direction Z are perpendicular to one another.

Of course, the first housing 1 is not limited to the structure shown in FIG. 7, and other shapes are possible, which may be determined according to the actual situation.

In some embodiments, in order to facilitate the disassembly and assembly of components in the first housing 1, as shown in FIG. 7, the first housing 1 is formed by assembling together a first half housing 19a and a second half housing 19b. In this way, when the components in the first housing 1 (e.g., the first reel 21) are damaged and need to be replaced, the first half housing 19a and the second half housing 19b may be disassembled, and then the components in the first housing 1 may be replaced, after the replacement, the first half housing 19a and the second half housing 19b are assembled together again, which is convenient.

Figure 8:
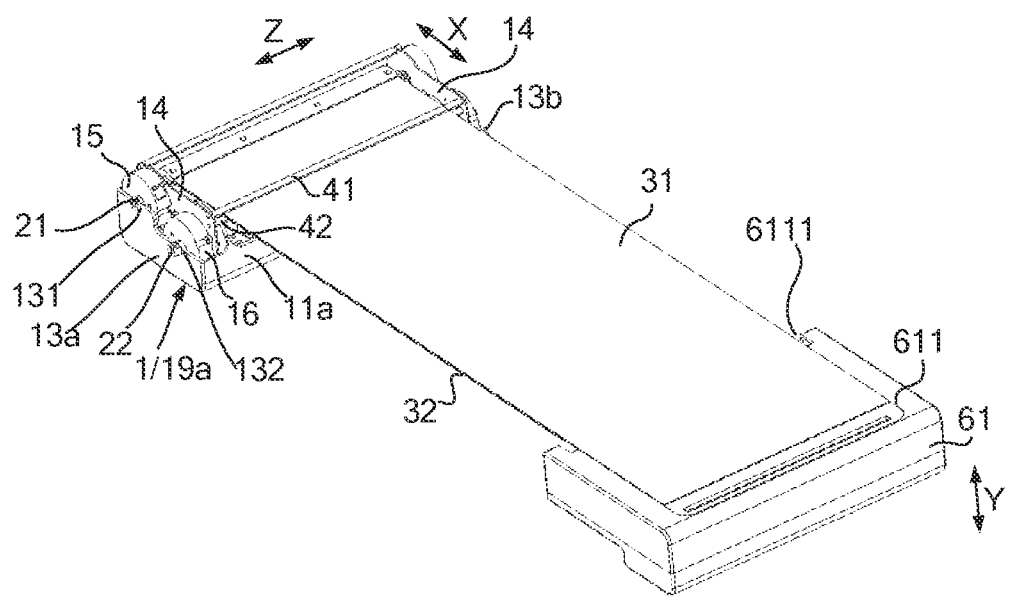
FIG. 8 is a schematic structural diagram of the display apparatus in FIG. 7 with a second half housing removed from a first housing.
Figure 9:
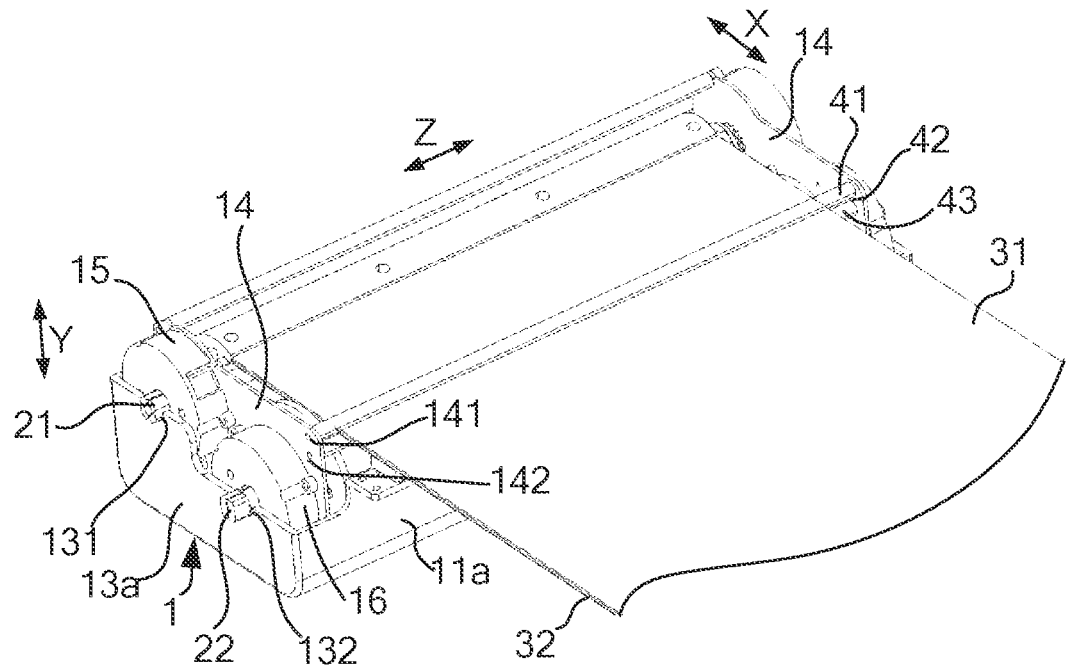
FIG. 9 is a schematic diagram showing an internal structure of the first housing in FIG. 8.

As shown in FIGS. 8 and 9, in some embodiments, the first reel 21 extends in the third direction Z (that is, a length direction of the first reel 21 is the same as the third direction Z), and two ends of the first reel 21 are fitted into first mounting holes 131 disposed on the fifth housing wall 13a and the sixth housing wall 13b respectively, so that the first reel 21 is rotatably disposed in the first housing 1.

The second reel 22 extends in the third direction Z (that is, a length direction of the second reel 22 is the same as the third direction Z), and is arranged at intervals with the first reel 21. Two ends of the second reel 22 are fitted into second mounting holes 132 disposed on the fifth housing wall 13a and the sixth housing wall 13b respectively, so that the second reel 22 is rotatably disposed in the first housing 1.

Of course, the first reel 21 and the second reel 22 are not limited to the rotatable connection structure described above. For example, the two ends of the first reel 21 and the two ends of the second reel 22 may be connected to the fifth housing wall 13a and the sixth housing wall 13b through bearings, respectively, which may be determined according to the actual situation.

Figure 3:
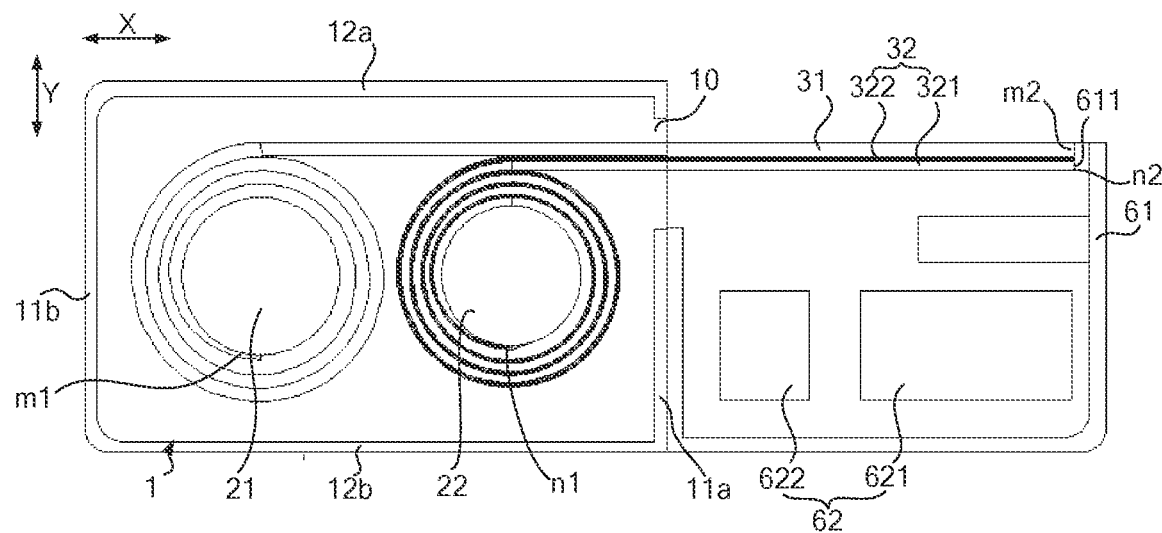
FIG. 3 is a sectional view of a flexible display panel of a display apparatus in a curled up state, in accordance with some embodiments of the present disclosure.

As shown in FIG. 3, in some embodiments, a first end (indicated by the reference numeral m1 in FIG. 3) of the flexible display panel 31 is connected (e.g., adhered) to the side surface of the first reel 21, and is wound on the first reel 21. A second end (indicated by the reference numeral m2 in FIG. 3) of the flexible display panel 31 extends out of the housing through the opening 10. A first end (indicated by the reference numeral n1 in FIG. 3) of the flexible support plate 32 is connected (e.g., adhered) to a side surface of the second reel 22, and is wound on the second reel 22. A second end (indicated by the reference numeral n2 in FIG. 3) of the flexible support plate 32 extends out of the housing through the opening 10. The flexible display panel 31 and the flexible support plate 32 are wound on different reels respectively, compared with the flexible display panel 31 and the flexible support plate 32 are wound on the same reel, the force required for bending the flexible display panel 31 and the flexible support plate 32 is smaller during winding, so that the difficulty of winding the flexible display panel 31 and the flexible support plate 32 may be greatly reduced (if the flexible display panel 31 and the flexible support plate 32 are wound on the same reel, the thicknesses of the flexible display panel 31 and the flexible support plate 32 are great, so the force required for bending is large). As a result, the winding of the flexible display panel 31 and the flexible support plate 32 may be ensured to be smooth.

Of course, the first end of the flexible display panel 31 is not limited to be connected to the side surface of the first reel 21. For example, a connection slot may be provided in the side surface of the first reel 21, and the first end of the flexible display panel 31 extends into the connection slot and connected to a slot wall of the connection slot. The first end of the flexible support plate 32 is also not limited to be connected to the side surface of the second reel 22. For example, a connection slot may be provided in the side surface of the second reel 22, and the first end of the flexible support plate 32 extends into the connection slot and connected to a slot wall of the connecting slot.

When the flexible display panel 31 and the flexible support plate 32 extend out of the first housing 1 through the opening 10, in order to achieve a purpose that the flexible support plate 32 is attached to the flexible display panel 31, embodiments of the present disclosure are provided below.

Figure 5:
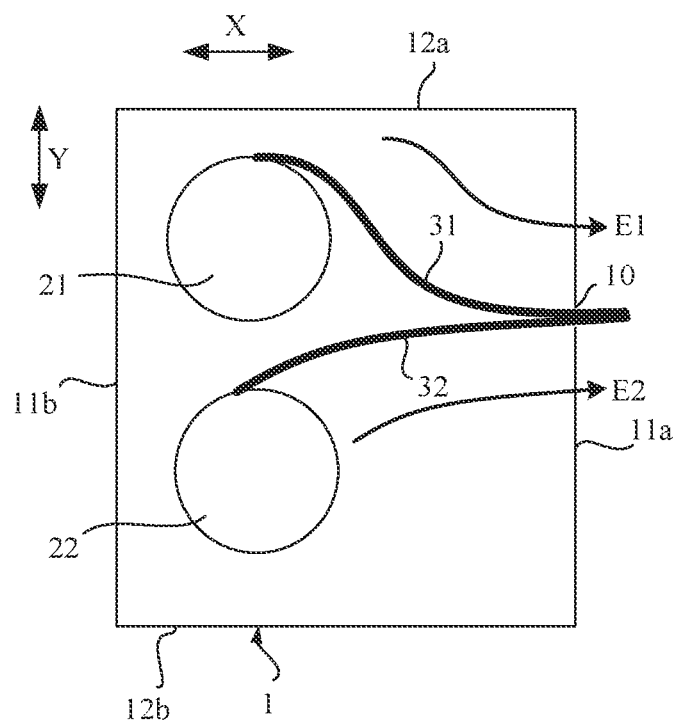
FIG. 5 is a schematic structural diagram showing a relationship of a first reel, a second reel and an opening of a display apparatus, in accordance with some embodiments of the present disclosure.

FIG. 5 shows an embodiment for achieving a purpose that the flexible support plate 32 is attached to the flexible display panel 31. The opening 10 is disposed in the first housing wall 11a, and a dimension of the opening 10 in the second direction Y matches a sum of the thicknesses of the flexible support plates 32 and the flexible display panel 31. The first reel 21 and the second reel 22 are arranged at intervals in the second direction Y. The flexible display panel 31 extends out of the first housing 1 from a side of the first reel 12 proximate to the third housing wall 12a, and the flexible support plate 32 extends out of the first housing 1 from a side of the second reel 22 proximate to the third housing wall 12a. In the embodiment, an extending direction E2 of the flexible support plate 32 from the second reel to the outside of the first housing 1 is not parallel to an extending direction E1 of the flexible display panel 31 from the first reel 21 to the outside of the first housing 1. The dimension of the opening 10 in the second direction Y is set to match the sum of the thicknesses of the flexible display panel 31 and the flexible support plate 32, in this way, when the flexible display panel 31 and the flexible support plate 32 extend out of the first housing 1 through the opening 10, the opening 10 may press the flexible display panel 31 and the flexible support plate 32 to change the extending directions of the flexible display panel 31 and the flexible support plate 32, so that the flexible display panel 31 and the flexible support plate 32 are gradually approach and attach to each other. As a result, the flexible support plate 32 supports the flexible display panel 31.

As shown in FIG. 5, the dimension of the opening 10 in the second direction Y match the sum of the thicknesses of the flexible display panel 31 and the flexible support plate 32, which means that the dimension of the opening 10 in the second direction Y is equal to or approximate equal to the sum of the thicknesses of the flexible display panel 31 and the flexible support plates 32.

FIG. 2 shows another embodiment for achieving a purpose that the flexible support plate 32 is attached to the flexible display panel 31, the opening 10 is disposed in the first housing wall 11a, and the second reel 22 is disposed between the first housing wall 11a and the first reel 21, that is, the first reel 2 and the second reel 22 are arranged at intervals in the first direction X. An extending direction E2 of the flexible support plate 32 from the second reel 22 to the outside of the first housing 1 is parallel to an extending direction E1 of the flexible display panel 31 from the first reel 21 to the outside of the rst housing 1, and a portion of the flexible support plate 32 extending out of the second reel 22 is attached to a portion of the flexible display panel 31 extending out of the first reel 21. In the embodiment, the second reel 22 is located between the first reel 21 and the first housing 11a, so that the flexible display panel 31 may pass through the second reel 22 when extending from the first reel 21; moreover, the extending direction of the flexible support plate 32 from the second reel 22 to the outside of the first housing 1 is parallel to the extending direction of the flexible display panel 31 from the first reel 21 to the outside of the first housing 1, so that the portion of the flexible display panel 31 extending out of the first reel 21 is attached to the portion of the flexible support plate 32 extending out of the second reel 22. Therefore, there is no need to change the extending directions of the flexible display panel 31 and the flexible support plate 32 by the opening 10 to cause the flexible display panel 31 and the flexible support plate 32 to be attached to each other. As a result, the dimension of the opening 10 in the second direction Y may be designed to be large, and as a result, the contact friction of both the flexible display panel 31 and the flexible support plate 32 and an edge of the opening 10 may be reduced in the process of extending out or retracting relative to the first housing 1.

It is possible to achieve the above purpose by adjusting a distance, in the second direction Y, between an edge a (an edge of the first reel 21 proximate to the third housing wall 12a) of the first reel 21 and an edge b (an edge of the second reel 22 proximate to the third housing wall 12a) of the second reel 22. For example, as shown in FIG. 2, the distance, in the second direction Y, between the edge a of the first reel 21 and the edge b of the second reel 22 may be set as the thickness of the flexible support plate 32.

Figure 6:
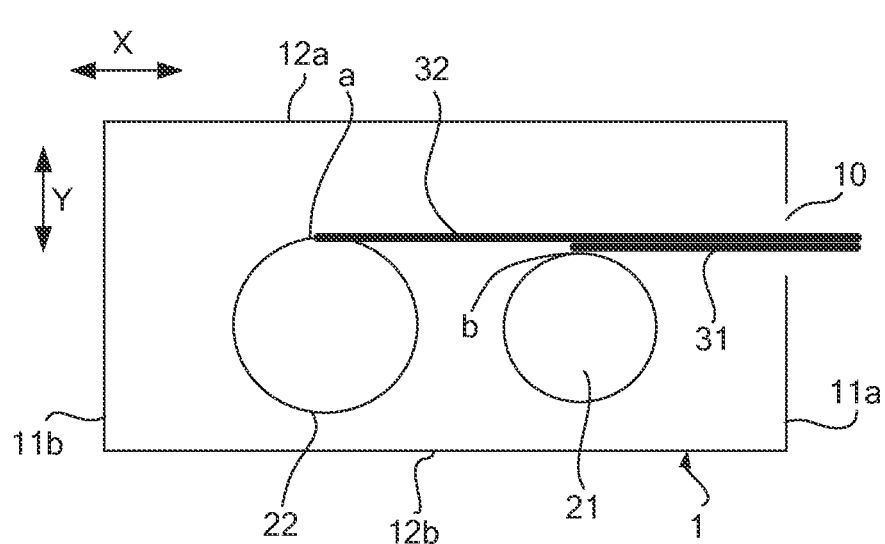
FIG. 6 is a schematic structural diagram showing a relationship of a first reel, a second reel and an opening of another display apparatus, in accordance with yet some other embodiments of the present disclosure.

Alternatively, the positions of the first reel 21 and the second reel 22 may be reversed, that is, as shown in FIG. 6, the first reel 21 is disposed between the first housing wall 11a and the second reel 22, the effect obtained after the positions of the second reel 22 is reversed is the same as that obtained before the reversal, and will not be repeated here.

As shown in FIGS. 2 and 6, in the process of the flexible display panel 31 extending out of the first housing 1 through the opening 10, in order to ensure that the flexible support plate 32 may be more closely attached to the flexible display panel 31, embodiments of the present disclosure are provided below.

Figure 10:
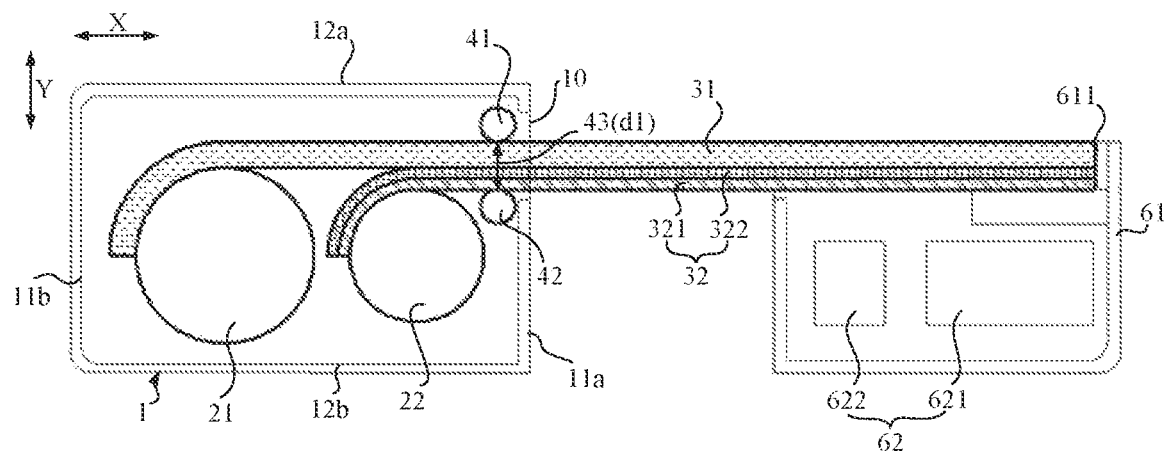
FIG. 10 is a schematic structural diagram of a display apparatus provided with a first limiting member and a second limiting member therein, in accordance with some embodiments of the present disclosure.

FIGS. 9 and 10 show embodiments of making the flexible support plate 32 to be attached to the flexible display panel 31 more closely. In these embodiments, the display apparatus further includes a first limiting member 41 and a second limiting member 42 disposed in the first housing 1. The first limiting member 41 and the second limiting member 42 have a first gap 43 therebetween, and the flexible display panel 31 and the flexible support plate 32 pass through the first gap 43; a width d1 of the first gap 43 is less than or equal to the sum of the thicknesses of the flexible display panel 31 and the flexible support plate 32 In this way, when the flexible display panel 31 and the flexible support plate 32 pass through the first gap 43, the first limiting member 41 and the second limiting member 42 may apply a damping force to the flexible display panel 31 and the flexible support plate 32, so that the flexible display panel 31 and the flexible support plate 32 are closely attached together; as a result, the flexible support plate 32 provides a good support to the flexible display panel 32.

The structures of the first limiting member 41 and the second limiting member 42 are not unique. For example, the first limiting member 41 and the second limiting member 42 may both be limiting rollers. As shown in FIGS. 9 and 10, the first limiting member 41 is a first limiting roller, and the second limiting member 42 is a second limiting roller. The first housing 1 further includes two fixing walls 14 disposed in the first housing 1 in the third direction Z at intervals. Both the first limiting roller and the second limiting roller extend in the third direction Z, both ends of the first limiting roller are respectively fitted into third mounting holes 141 disposed in the two fixing walls 14, and both ends of the second limiting rollers are respectively fitted into fourth mounting holes 142 disposed in the two fixing walls 14, so that the first limiting roller and the second limiting roller may be rotatably arranged in the first housing 1.

Alternatively, in addition to the above structure, both ends of the first limiting roller and the second limiting roller maybe respectively fitted into the mounting holes disposed in the fifth housing wall 13a and the sixth housing wall 13b, so that the first limiting roller and the second limiting roller may be rotatably arranged in the first housing 1.

In addition, the first limiting member 41 and the second limiting member 42 may also be limiting rods disposed in the first housing 1; two ends of the limiting rod are respectively connected to the two fixing walls 14, or the two ends of the limiting rod are respectively fixedly connected to the fifth housing wall 13a and the sixth housing wall 13b. Compared with the limiting rods, in a case where the first limiting member 41 and the second limiting member 42 are both the limiting rollers, both the first limiting roller and the second limiting roller may rotate when the flexible display panel 31 and the flexible support plate 32 extend out of the first housing 1, which greatly reduces the frictional resistance between both the flexible display panel 31 and the flexible support plate 32 and the first limiting roller and the second limiting roller during the extension process, thereby ensuring the extension of the flexible display panel 31 and the flexible support plate 32 is smooth.

Figure 11:
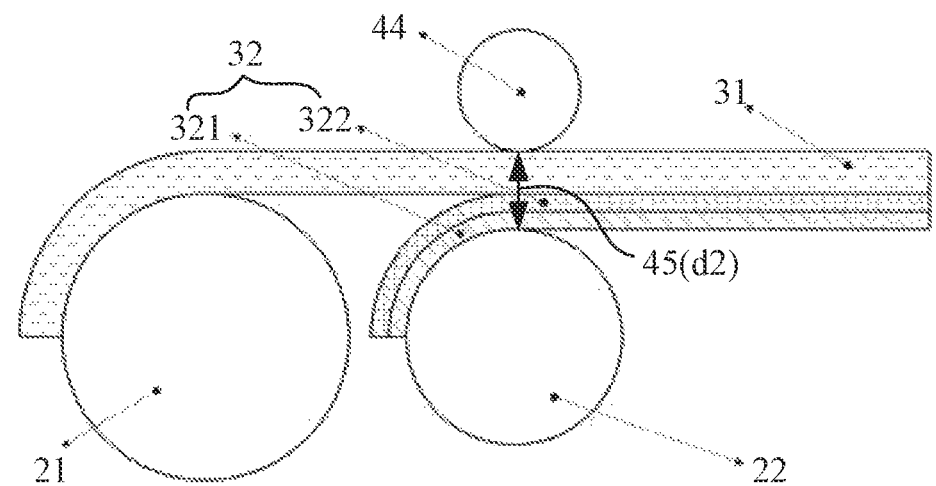
FIG. 11 is a schematic structural diagram of a display apparatus provided with a third limiting member therein, in accordance with some embodiments of the present disclosure.
Figure 12:
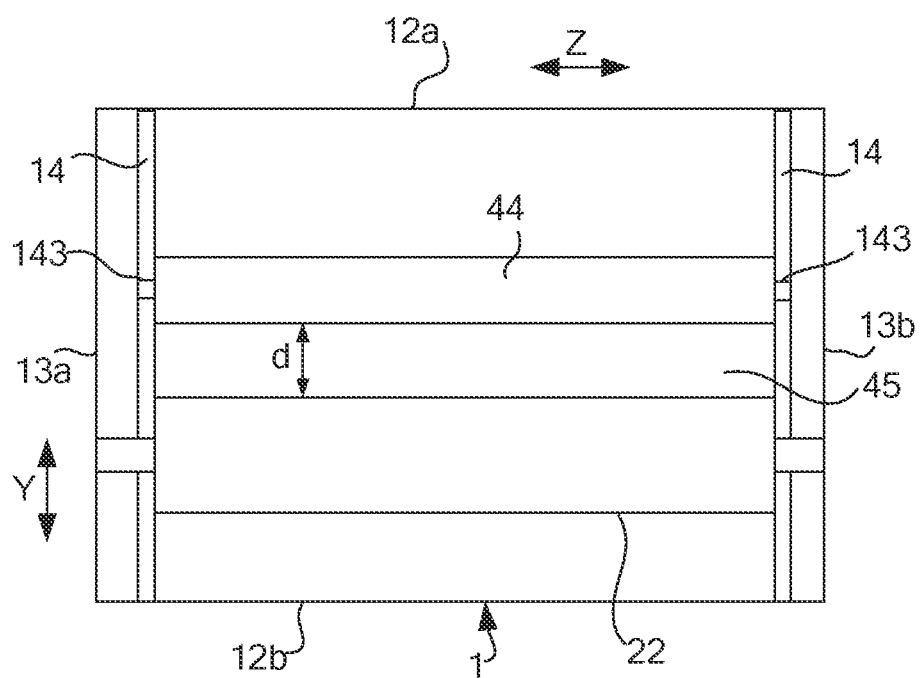
FIG. 12 is a schematic structural diagram showing a positional relationship of a second reel and a third limiting member of a display apparatus, in accordance with some embodiments of the present disclosure.

FIGS. 11 and 12 show other embodiments for making the flexible support plate 32 to be attached to the flexible display panel 31 more closely. In these embodiments, the display apparatus further includes a third limiting member 44 in the first housing 1, the third limiting member 44 and the second reel 22 have a second gap 45 therebetween, and the flexible display panel 31 and the flexible support plate 32 pass through the second gap 45; the width d2 of the second gap 45 is less than or equal to the sum of the thicknesses of the flexible display panel 31 and the flexible support plate 32. In this way, when the flexible display panel 31 and the flexible support plate 32 pass through the second gap 45, the third limiting member 44 and the second reel 22 may apply a clamping force to the flexible display panel 31 and the flexible support plate 32, so that the flexible display panel 31 and the flexible support plate 32 are closely attached together. As a result, the flexible support plate 32 has a good support to the flexible display panel 32.

The structure of the third limiting member 44 is not unique, for example, as shown in FIG. 12, the third limiting member 44 may be a third limiting roller, the third limiting roller extends in the third direction Z, and both ends of the third limiting roller are respectively fitted into fifth mounting holes 143 disposed in the two fixing walls 14, so that the third limiting roller may be rotatably arranged in the first housing 1. Alternatively, in addition to the above structure, both ends of the third limiting roller may be fitted into the mounting holes disposed in the fifth housing wall 13a and the sixth housing wall 13b respectively, so that the third limiting roller may be rotatably arranged in the first housing 1.

In addition, the third limiting member 44 may be a limiting rod disposed in the first housing 1, and two ends of the limiting rod are respectively fixedly connected to the two fixing walls 14, or the two ends of the limiting rod are respectively fixedly connected to the fifth housing wall 13a and the sixth housing wall 13b. Compared with the limiting rod, when the third limiting member 44 is the third limiting roller, the third limiting roller may rotate when the flexible display panel 31 and the flexible support plate 32 extend out of the first housing 1, which greatly reduces the frictional resistance between both the flexible display panel 31 and the flexible support plate 32 and the third limiting roller during the extension process, thereby ensuring the extension of the flexible display panel 31 and the flexible support plate 32 is smooth.

In the display apparatus, the manner of driving the flexible display panel 31 and the flexible support plate 32 to extend out and retract relative to the first housing 1 is not unique.

Figure 13:
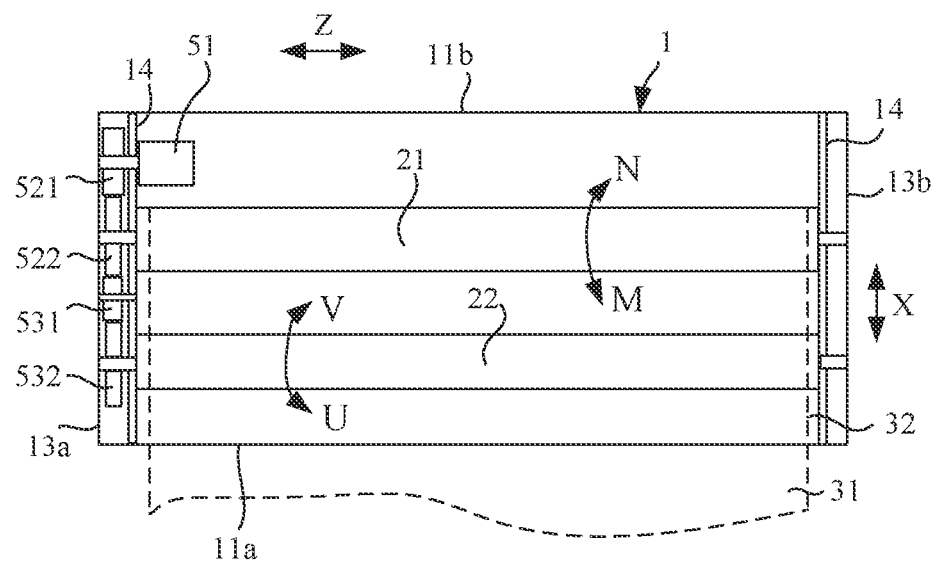
FIG. 13 is a schematic structural diagram of a display apparatus provided with a drive motor therein, in accordance with some embodiments of the present disclosure.

FIG. 13 shows an embodiment of driving the flexible display panel 31 and the flexible support plate 32 to extend out and retract relative to the first housing 1. In the embodiment, the display apparatus further includes a driving motor 51, a first gear 521, a second gear 522, a third gear 531 and a fourth gear 532. The first gear 521 is fixedly sleeved on an output shaft of the drive motor 51, the second gear 522 is fixedly sleeved on the first reel 21 and meshes with the first gear 521, the fourth gear 532 is fixedly sleeved on the second reel 22, and the third gear 531 is meshed between the second gear 522 and the fourth gear 532.

When the display apparatus needs to be used, the driving motor 51 rotates in a direction, so that the first reel 21 is driven to rotate in a first rotation direction M through the first gear 521 and the second gear 522, while the second reel 22 is driven to rotate in a third rotation direction U by the second gear 522 through the third gear 531 and the fourth gear 532. The first rotation direction M is consistent with the third rotation direction U. In this case, the flexible display panel 31 and the flexible support plate 32 extend out of the first housing 1 through the opening 10.

When the use of the display apparatus is finished, the driving motor 51 rotates in a reverse direction, so that the first reel 21 is driven to rotate in a second rotation direction N through the first gear 521 and the second gear 522, while the second reel 22 is driven to rotate in the fourth rotation direction V by the second gear 522 through the third gear 531 and the fourth gear 532. The second rotation direction N is consistent with the fourth rotation direction V. In this case, the flexible display panel 31 is wound on the first reel 21, and the flexible support plate 32 is wound on the second reel 22, so that the flexible display panel 31 and the flexible support plate 32 retract into the first housing 1 through the opening 10.

When the display apparatus is in an initial state (i.e., an unused state), the second end of the flexible display panel 31 and the second end of the flexible support plate 32 may be located outside the first housing 1, or may be located in the first housing 1, which is not specifically limited here.

Figure 14:
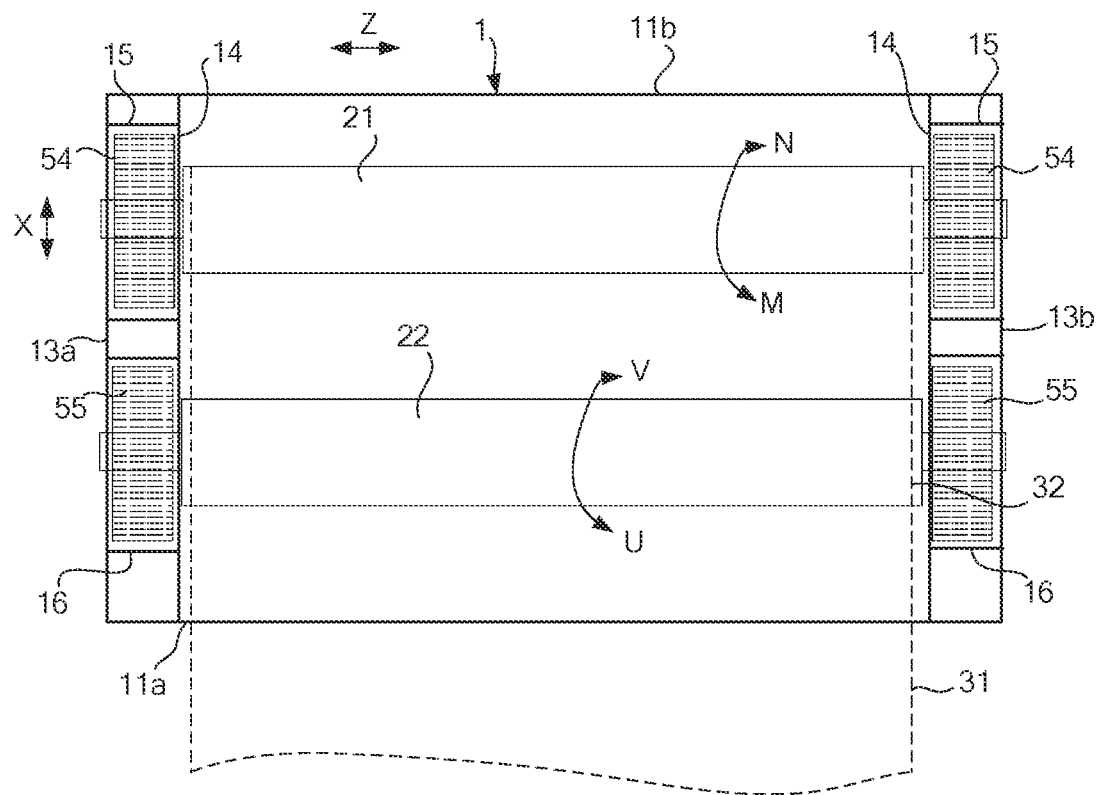
FIG. 14 is a schematic structural diagram of a display apparatus provided with a first spring and a second spring therein, in accordance with some embodiments of the present disclosure.
Figure 15:
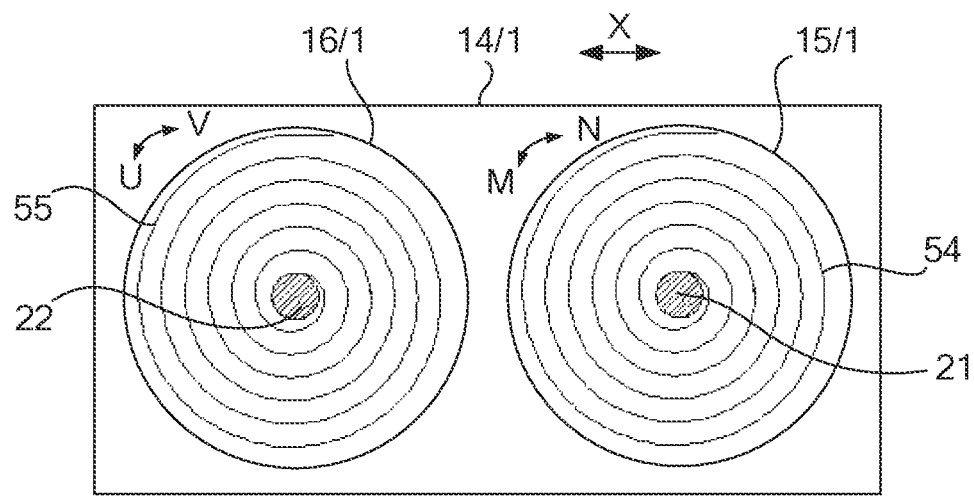
FIG. 15 is an installation structural diagram of a first spring and a second spring of a display apparatus, in accordance with some embodiments of the present disclosure.

FIGS. 14 and 15 show other embodiments of driving the flexible display panel 31 and the flexible support plate 32 to extend out and retract relative to the first housing 1. In these embodiments, the display apparatus further includes first spring(s) 54 and second spring(s) 55.

As shown in FIG. 15, the first spring 54 is in a spiral shape and is arranged around the first reel 21. An end of the first spring 54 is connected to the first reel 21, and another end is connected to the first housing 1. The first spring 54 is configured such that when the first reel 21 rotates in the first rotational direction M, the first spring 54 may be wound up to apply a first restoring force for driving the first reel 21 to rotate in the second rotational direction N to the first reel 21.

As shown in FIG. 15, the second spring 55 is in a spiral shape and is arranged around the second reel 22. An end of the second spring 55 is connected to the second reel 22, and another end is connected to the first housing 1. The second spring 55 is configured such that when the second reel 22 rotates in the third rotational direction U, the second spring 55 may be wound up to apply a second restoring force for driving the second reel 22 to rotate in the fourth rotational direction V to the second reel 22.

As shown in FIGS. 14 and 15, when the display apparatus needs to be used, users pull the flexible display panel 31 and the flexible support plate 32 out of the first housing 1 by a hand. Thus, the flexible display panel 31 separates from the first reel 21 gradually, and drives the first reel 21 to rotate in the first rotation direction M, in this case, a first reset member (e.g., the first spring 54) is tightened to apply the first reset force to the first reel 21; meanwhile, the flexible support plate 32 separates from the second reel 22 gradually, and drives the second reel 22 to rotate in the third rotation direction U, in this case, a second reset member (e.g., the second spring 55) is tightened to apply the second reset force to the second reel 22.

As shown in FIGS. 14 and 15, when the use of the display apparatus is finished, the first reel 21 rotates in the second rotation direction N due to the action of the first restoring force, so that the flexible display panel 31 is gradually wound on the first reel 21; the second reel 22 rotates in the fourth rotation direction V due to the action of the second restoring force, so that the flexible support plate 32 is gradually wound on the second reel 22. As a result, the flexible display panel 31 and the flexible support plate 32 retract into the first housing 1.

In these embodiments, the flexible display panel 31 and the flexible support plate 32 retract into the first housing 1 due to the action of the restoring force of the springs, so that the driving of the motor is not required, and the structure of the display apparatus is more simple, which is beneficial to reduce the cost of the display apparatus.

In some embodiments, in order to enable the first spring 54 to drive the first reel 21 to rotate in the second rotation direction N better, as shown in FIG. 14, there are two first springs 54, and the two first springs 54 are respectively disposed at the two ends of the first reel 21. In this way, when the two first springs 54 are wound up, the first restoring force may be applied to both ends of the first reel 21 simultaneously, so that the force on the first reel 21 is more balanced, and the first reel 21 rotates in the second direction N more smoothly.

Figure 16:
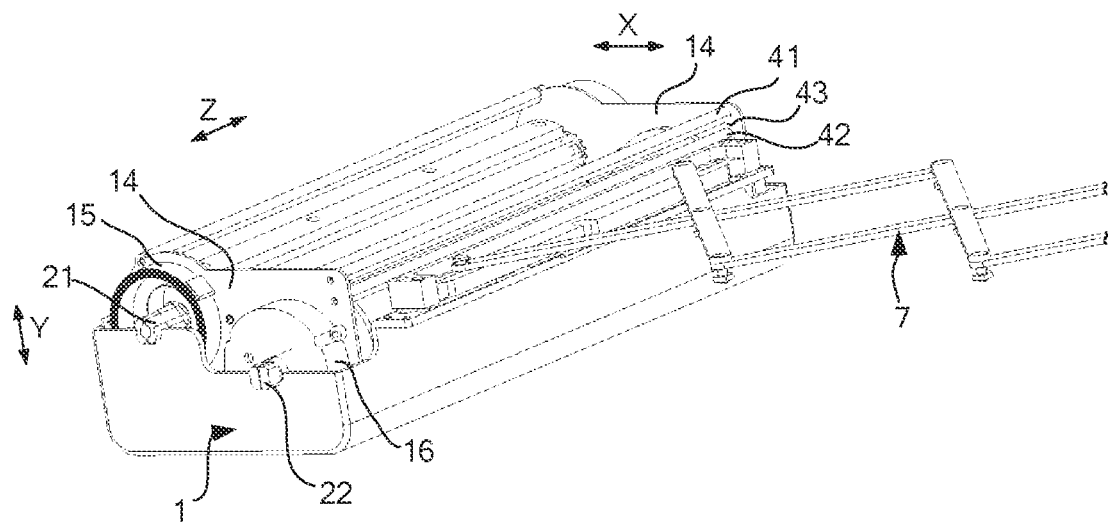
FIG. 16 is a schematic structural diagram of arrangement positions of a first installation housing and a second installation housing in a display apparatus, in accordance with some embodiments of the present disclosure.
Figure 17:
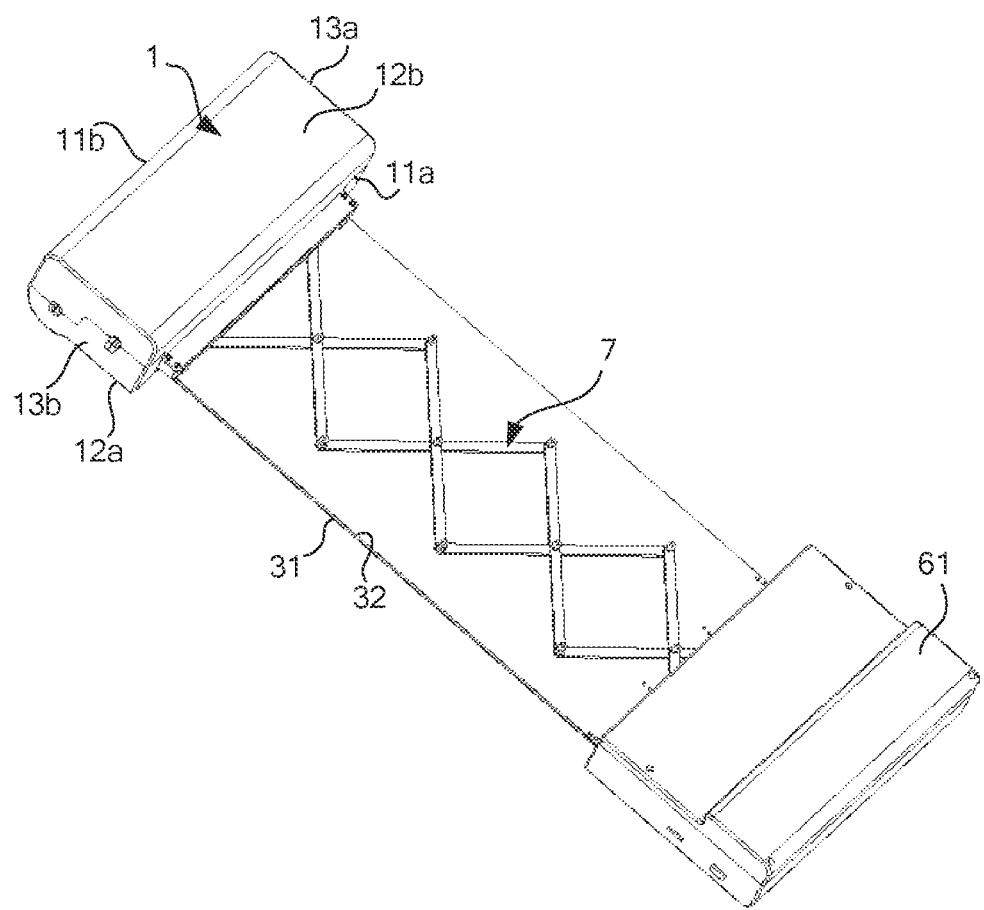
FIG. 17 is a schematic structural diagram of a scissor mechanism in a display apparatus, in accordance with some embodiments of the present disclosure.

The first spring(s) 54 may be installed in the following manner. As shown in FIGS. 14 and 16, the first housing 1 further includes first fixing housings 15 each disposed on the fixing wall 14. The first spring 54 is arranged in the first fixing housing 15, one end thereof is connected to the first reel 21, and the other end thereof is connected to the first fixing housing 15. Alternatively, the first fixing housing 15 may not be provided, one end of the first spring 54 is connected to the first reel 21, and the other end of the first spring 54 is connected to the third housing wall 12a or the fourth housing wall 12b.

In some embodiments, in order to enable the second spring 55 to drive the second reel 22 to rotate in the fourth rotation direction V better, as shown in FIG. 14, there are two second springs 55, and the two second springs 55 are respectively disposed at the two ends of the second reel 22. In this way, when the two second springs 55 are wound up, the second restoring force may be applied to both ends of the second reel 22 simultaneously, so that the force on the second reel 22 is more balanced, and the second reel 22 rotates in the fourth direction V more smoothly.

The second spring(s) 55 may be installed in the following manner. As shown in FIGS. 14 and 16, the first housing 1 further includes second fixing housings 16 each disposed on the fixing wall 14. The second spring 55 is arranged in the second fixing housing 16, one end thereof is connected to the second reel 22, and the other end thereof is connected to the second fixing housing 16. Alternatively, the second fixing housing 16 may not be provided, and one end of the second spring the 55 is connected to the second reel 22, and the other end thereof is connected to the third housing wall 12a or the fourth housing wall 12b.

In some embodiments, in order to optimize the arrangement of the display driving components of the flexible display panel 31, as shown in FIG. 2, the display apparatus further includes a second housing 61 and a display driver 62. The display driver 62 is disposed in the second housing 61 and is configured to drive the flexible display panel 31 to perform display; the second end of the flexible display panel 31 and the second end of the flexible support plate 32 are both connected to the second housing 61. The display driver 62 is disposed in the second housing 61, that is, the display driver 62 is disposed separately from mechanical moving components such as the first reel 21 and the second reel 22. In this way, it may be possible not only to avoid the positional interference of the display driver 62 and the components such as the first reel 21 and the second reel 22, but also to prevent the display driver 62 from being interfered by the mechanical moving components such as the first reel 21 and the second reel 22, thereby ensuring the normal operation of the display driver 62. In addition, since the second end of the flexible display panel 31 and the second end of the flexible support plate 32 are both connected to the second housing 61, the second housing 61 is also equivalent to a limiting device. When the flexible display panel 31 and the flexible support plate 32 retract into the first housing 1, the second housing 61 abuts against the first housing 1 to limit the positions of the flexible display panel 31 and the flexible support plate 32, so as to prevent the flexible display panel 31 and the flexible support plate 32 from retracting into the first housing 1 entirely.

As shown in FIG. 2, the display driver 62 may include a driving circuit board 621 and a power supply 622 (e.g., a battery). The driving circuit board 621 is electrically connected to the flexible display panel 31, and the power supply 622 is electrically connected to the driving circuit board 621.

In some embodiments, as shown in FIG. 2, an installation slot 611 is provided on a surface of the housing wall of the second housing 61, and in a direction in which the flexible display panel 31 extends out or retracts relative to the first housing 1 (i.e., the first direction X), an end of the installation groove 611 proximate to the first housing 1 has an insertion opening 6111, and an end of the installation groove 611 away from the first housing 1 is sealed. The second end of the flexible display panel 31 and the second end of the flexible support plate 32 extend into the installation slot 611 through the insertion opening 6111, in the installation groove 611, a surface (the lower surface shown in FIG. 2) of the flexible support plate 32 is adhered to a slot wall of the installation slot 611, and another surface (the upper side surface shown in FIG. 2) is attached to the flexible display panel 31. In the installation slot 611, a surface of the flexible support plate 32 is adhered to a slot base of the installation slot 611, and another surface is attached to the flexible display panel 31, so that the flexible display panel 31 and the flexible support plate 32 is more stably arranged in the installation slot 611, so as to prevent the flexible display panel 31 and the flexible support plate 32 from shaking in the installation slot 611. In addition, the installation slot 611 may protect portions of the flexible display panel 31 and the flexible support plate 32 that extend into the installation slot 611, so that it is possible to prevent edges and corners of the flexible display panel 31 and the flexible support plate 32 from extending out of the surface of the second housing 61 to be damaged.

In some embodiments, in order to prevent the flexible display panel 31 and the flexible support plate 32 from retracting into the first housing 1 due to the action of the first spring(s) 54 and the second spring(s) 55 when the flexible display panel 31 and the flexible support plate 32 are unfolded, as shown in FIGS. 17 to 20, the display apparatus further includes a scissor mechanism 7 connected between the first housing 1 and the second housing 61.

Figure 18:
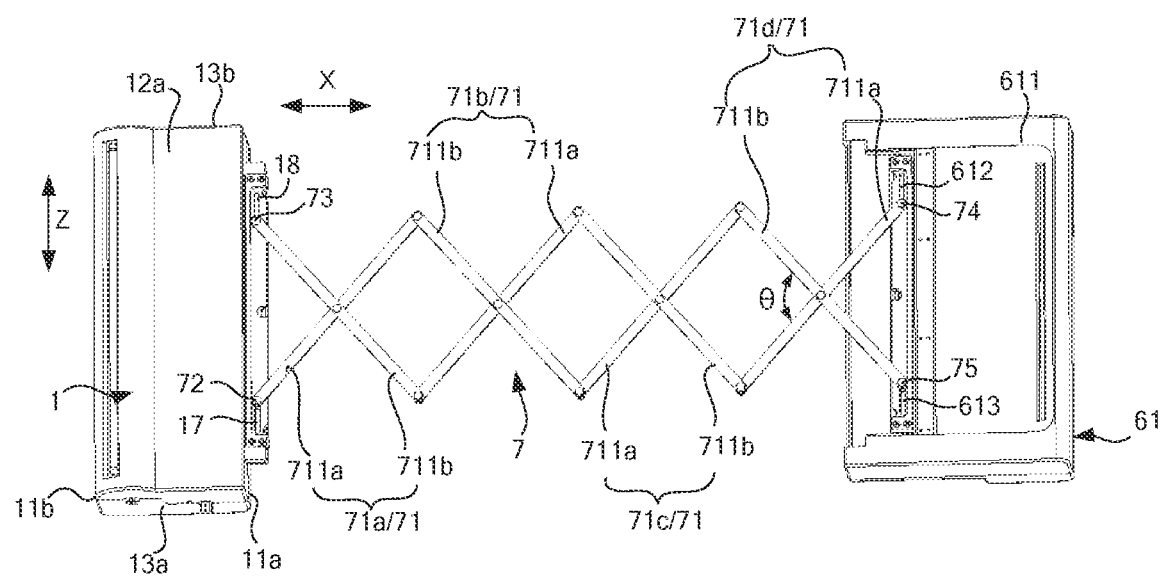
FIG. 18 is a schematic structural diagram showing a connection of a scissor mechanism and a first housing and a second housing in a display apparatus, in accordance with some embodiments of the present disclosure.
Figure 19:
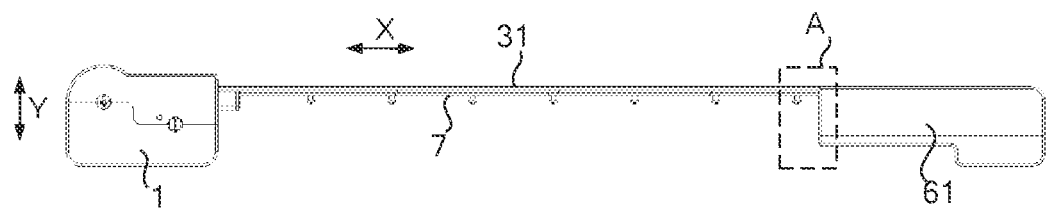
FIG. 19 is a side view of a flexible display panel of a display apparatus in an unfolded state, in accordance with some embodiments of the present disclosure.

As shown in FIG. 18, the scissor mechanism 7 includes four connecting rod groups 71 (i.e., a connecting rod group 71a, a connecting rod group 71b, a connecting rod group 71c, and a connecting rod group 71d) arranged in the direction (i.e., the first direction X) in which the flexible display panel 31 extends out or retracts relative to the first housing 1. Each connecting rod group 71 includes a connecting rod 711a and a connecting rod 711b whose middle portions are hinged together.

In the connecting rod group 71a, an end of the connecting rod 711a proximate to the first housing 1 is provided with a first articulated shaft 72 thereon, and an end of the connecting rod 711b proximate to the first housing 1 is provided with a second articulated shaft 73 thereon. The first housing 1 is provided with a first sliding groove 17 and a second sliding groove 18 that are arranged at intervals in the third direction Z therein, and the first sliding groove 17 and the second sliding groove 18 both extend in the third direction Z. The first articulated shaft 72 extends into the first sliding groove 17, and is slidably engaged with the first sliding groove 17, so that the end of the connecting rod 711a proximate to the first housing 1 is movably connected to the first housing 1; the second articulated shaft 73 extends into the second sliding groove 18, and is slidably engaged with the second sliding groove 18, so that the end of the connecting rod 711b proximate to the first housing 1 is movably connected to the first housing 1.

In the connecting rod group 71a and the connecting rod group 71b, another end of the connecting rod 711a in the connecting rod group 71a is hinged with an end of the connecting rod 711b in the connecting rod group 71b, and another end of the connecting rod 711b in the connecting rod group 71a is hinged with an end of the connecting rod 711a in the rod group 71b.

In the connecting rod group 71b and the connecting rod group 71c, another end of the connecting rod 711a in the connecting rod group 71b is hinged with an end of the connecting rod 711b in the connecting rod group 71c, and another end of the connecting rod 711b in the connecting rod group 71b is hinged with an end of the connecting rod 711a in the rod group 71b.

In the connecting rod group 71c and the connecting rod group 71d, another end of the connecting rod 711a in the connecting rod group 71c is hinged with an end of the connecting rod 711b in the connecting rod group 71d, and another end of the connecting rod 711b in the connecting rod group 71c is hinged with an end of the connecting rod 711a in the rod group 71d.

In the connecting rod group 71d, an end of the connecting rod 711a proximate to the second housing 61 is provided with a third articulated shaft 74 thereon, an end of the connecting rod 711b proximate to the second housing 61 is provided with a fourth articulated shaft 75 thereon. The second housing 61 is provided with a third sliding groove 612 and a fourth sliding groove 613 that are arranged at intervals in the third direction Z therein, and the third sliding groove 612 and the fourth sliding groove 613 both extend along the third direction Z. The third articulated shaft 74 extends into the third sliding groove 612, and is slidably engaged with the third sliding groove 612, so that the end of the connecting rod 711a proximate to the second housing 61 is movably connected to the second housing 61; the fourth articulated shaft 75 extends into the fourth sliding groove 613, and is slidably engaged with the fourth sliding groove 613, so that the end of the connecting rod 711b proximate to the second housing 61 is movably connected to the second housing 61.

Of course, in the scissor mechanism 7, the number of connecting rod groups 71 may be two, three, and the like in addition to four, which is determined according to the maximum lengths of the flexible display panel 31 and the flexible support plate 32. In the connecting rod group 71a, the end of the connecting rod 711a or the connecting rod 711b proximate to the first housing 1 is capable of moving relative to the first housing 1 in the third direction Z; in the connecting rod group 71d, the end of the connecting rod 711a or the connecting rod 711b proximate to the second housing 61 is capable of moving relative to the second housing 61 in the third direction Z.

In the scissor mechanism 7, as shown in FIG. 18, the connecting rod 711a and the connecting rod 711b in each connecting rod group 71 intersect to form a certain angle θ. With an extension distance of flexible display panel 31 and flexible support plate 32 becomes larger, the angle θ formed by the intersection of the connecting rod 711a and the connecting rod 711b becomes smaller. When the angle θ is decreases to a certain value, the scissor mechanism 7 may overcome the restoring force of the first spring 54 and the second spring 55 to form a self-locking, so that the flexible display panel 31 and the flexible support plate 32 are kept at a certain position, and thus, even if the user releases his hand, the flexible display panel 31 and the flexible support plate 32 may not retract into the first housing 1 due to the action of the first spring(s) 54 and the second spring(s) 55, which facilitates the usage of the users. In a case where there is a need to retract the flexible display panel 31 and the flexible support plate 32 into the housing 1, the second housing 61 is pushed toward the first housing 1 by the user to increase the angle θ formed by the intersection of the connecting rod 711a and the connecting rod 711b to break the self-locking of the scissor mechanism 7, so that the flexible display panel 31 and the flexible support plate 32 may retract into the first housing 1 due to the action of the first spring(s) 54 and the second spring(s) 55.

Figure 20:
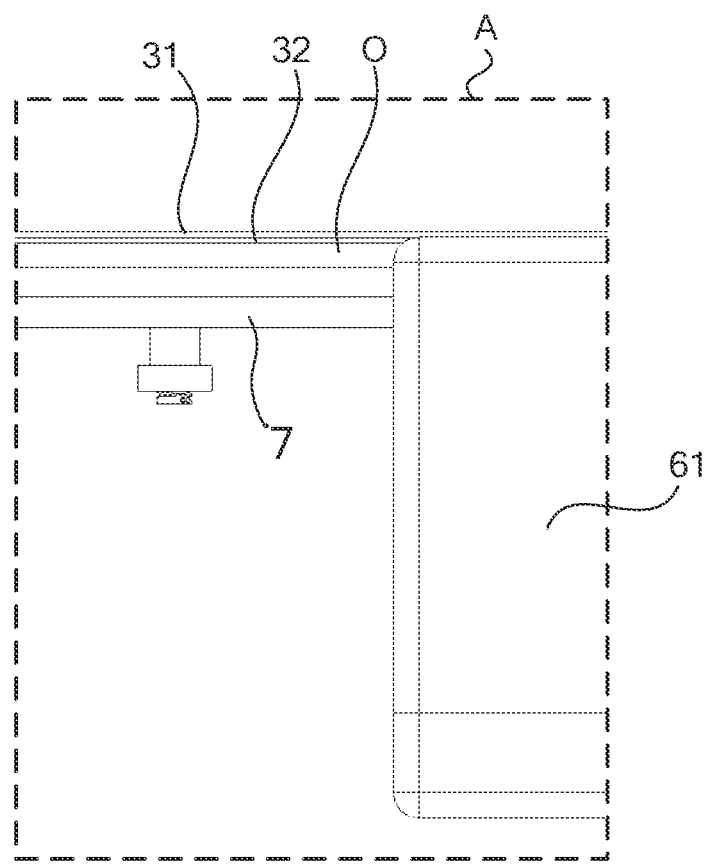
FIG. 20 is a partial enlarged view of the region A in FIG. 19.

The scissors mechanism 7 may be in contact with the flexible support plate 32. However, in order to reduce the friction between the scissors mechanism 7 and the flexible support plate 32, as shown in FIG. 20, the support plate 32 and the scissors mechanism 7 may be arranged at intervals, and the reference numeral O in FIG. 20 indicates a gap between the scissors mechanism 7 and the flexible support plate 32.

The method that the flexible support plate 32 is attached to the flexible display panel 31 is not unique. In some embodiments, the flexible support plate 32 may be attached to the flexible display panel 31 by adhesion. As shown in FIGS. 2 to 4, 10 and 11, the flexible support plate 32 includes a flexible support plate body 321 and an adhesive film 322 adhered to a surface of the flexible support plate body 321. The adhesive film 322 is configured such that when the flexible display panel 31 and the flexible support plate 32 extend out of the first housing 1 through the opening 10, the adhesive film 322 be capable of gradually adhering to the flexible display panel 31, so that the flexible support plate 32 and the flexible display panel 31 are attached together, and the peeling force between the adhesive film 322 and the flexible display panel 31 is smaller than the peeling force between the adhesive film 322 and the flexible support plate body 321. In these embodiments, the flexible support plate 32 is attached to the flexible display panel 31 is achieved by adhesion, the structure is simple and the cost is low. In addition, the peeling force between the adhesive film 322 and the flexible display panel 31 is smaller than the peeling force between the adhesive film 322 and the flexible support plate body 321, which is possible to prevent the adhesive film 322 fro being separated from the flexible support plate body 321 when the adhesive film 322 is separated from the flexible display panel 31.

In order to facilitate the separation of the adhesive film 322 from the flexible display panel 31 when the flexible display panel 31 and the flexible support plate 32 retract into the first housing 1, the peeling force between the flexible display panel 31 and the flexible support plate 32 is less than 3 g/inch, that is, a surface of the adhesive film 322 which adhered to the flexible display panel 31 has weak adhesiveness. In this way, the adhesive film 322 is separated from the flexible display panel 31 with a small force, so that the flexible display panel 31 may be smoothly wound on the first reel 21, and the flexible support plate 32 may be smoothly wound on the second reel 22; and in turn, the flexible display panel 31 and the flexible support plate 32 may smoothly retract into the first housing 1.

In order to better protect the flexible display panel 31, the adhesive film 322 is an elastic film. Since the adhesive film 322 is the elastic film, in a case where the flexible support plate 32 is adhered to the flexible display panel 31, when the flexible display panel 31 is pressed, the adhesive film 322 may play a buffering role, thereby avoiding the flexible display panel 31 to be damaged due to the pressing.

A type of adhesive film is not unique, for example, as shown in FIG. 2, the adhesive film 322 may be a double-sided adhesive film. Alternatively, as shown in FIG. 4, the adhesive film 322 may be a single-sided adhesive film, an adhesive surface of the single-sided adhesive film is adhered t to the flexible display panel 31, and a surface of the single-sided adhesive film facing away from the adhesive surface is adhered to the flexible support plate body 321 through an adhesive layer 323.

Figure 4:
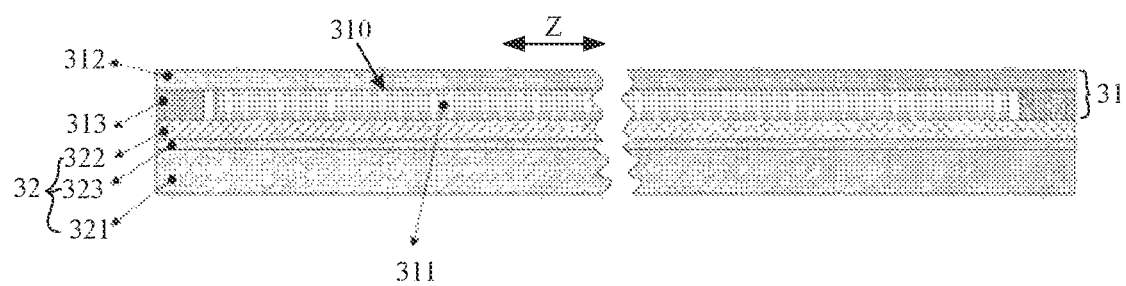
FIG. 4 is a sectional view of a flexible display panel attaching to a flexible support plate, in accordance with some embodiments of the present disclosure.

When the flexible display panel 31 is unfolded, in order to make the flexible support plate 32 to support the flexible display panel 31 better, as shown in FIG. 4, the flexible support plate body 321 is a steel sheet. Compared with other materials, the hardness of the steel sheet is relatively high, which may better support the flexible display panel 31, thereby ensuring the flatness of the flexible display panel 31. Moreover, the toughness of the steel sheet is relatively good, so that steel sheet may be easily wound on the second reel 22.

The steel sheet may be a stainless steel sheet.

In some embodiments, the flexible support plate 32 may be attached to the flexible display panel 31 by means of magnetic attraction. Details are as follows: a surface of the flexible support plate 32 is provided with a first magnetic attraction layer thereon, and a surface of the flexible display panel 31 is provided with a second magnetic attraction layer thereon. The flexible display panel 31 and the flexible support plate 32 are configured such that when the flexible display panel 31 and the flexible support plate 32 extend out of the first housing 1 through the opening 10, the first magnetic attraction layer and the second magnetic attraction layer are attracted to each other, so that the flexible support plate 32 is attached to the flexible display panel 31.

In some embodiments, as shown in FIG. 4, the flexible display panel 31 includes a panel body 311 and a flexible cover plate 312. A surface (the lower surface of the panel body 311 shown in FIG. 4) of the panel body 311 facing away from a display surface 310 thereof is configured to be attached to the flexible support plate 32; the flexible cover plate 312 covers the display surface (the upper surface of the panel body 311 shown in FIG. 4) of the panel body 311, and an edge of the flexible cover plate 312 exceeds an edge of the panel body 311 in the third direction Z.

In this embodiment, the edge of the flexible cover plate 312 is set beyond the edge of the panel body 311, that is, the edge of the flexible cover plate 312 is suspended, so that the edge of the flexible cover plate 312 is easy to sag. In order to solve the sagging of the edge of the flexible cover plate 312, as shown in FIG. 4, the flexible display panel 31 further includes an elastic support layer 313. The elastic support layer 313 is attached to the edge of the flexible cover plate 312, and is configured such that when the panel body 311 is attached to the flexible support plate 32, the elastic support layer 313 is located between the edge of the flexible cover plate 312 and the flexible support plate 32 to support the edge of the flexible cover plate 312. By providing the elastic support layer 313, when the flexible display panel 31 is unfolded, the elastic support layer 313 may fill a gap between the edge of the flexible cover plate 312 and the flexible support plate 32 to support the edge of the flexible cover plate 312, so that the edge of the flexible cover plate 312 is prevented from sagging and is protected from damage by external force.

The elastic support layer 313 may be a foam layer (as shown in FIG. 4), or may be a rubble layer, which is not specifically limited here.

In the above description of the embodiments, specific features, structures, materials or characteristics may be combined in any suitable manner in any one or more embodiments or examples.

The foregoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the scope of the present disclosure shall be subject to the protection scope of the claims.

What is claimed is:

1. A display apparatus, comprising:
    a first housing provided with an opening therein;
    a first reel rotatably disposed in the first housing;
    a second reel rotatably disposed in the first housing, the second reel and the first reel being arranged at intervals, and extending in a same direction;
    a flexible display panel, a first end of the flexible display panel being connected to the first reel and wound on the first reel;
    a flexible support plate, a first end of the flexible support plate being connected to the second reel and wound on the second reel;
    a first spring, the first spring being in a spiral shape and arranged around the first reel, an end of the first spring being connected to the first reel, and another end of the first spring being connected to the first housing; and
    a second spring, the second spring being in a spiral shape and arranged around the second reel, an end of the second spring being connected to the second reel, and another end of the second spring being connected to the first housing; wherein
    the flexible display panel and the flexible support plate are configured such that when the flexible display panel and the flexible support plate extend out of the first housing through the opening, the flexible support plate is capable of gradually attaching to the first housing to support the flexible display panel;

the first spring is configured such that when the first reel rotates in a first rotation direction, the first spring is tightened to apply a first restoring force for driving the first reel to rotate in a second rotation direction to the first reel, the first rotation direction being a rotation direction of the first reel when the flexible display panel extends out of the first housing through the opening, the second rotation direction being opposite to the first rotation direction; and the second spring is configured such that when the second reel rotates in a third rotation direction, the second spring is tightened up to apply a second restoring force for driving the second reel to rotate in a fourth rotation direction to the second reel; the third rotation direction being a rotation direction of the second reel when the flexible display panel extends out of the first housing through the opening, the fourth rotation direction being opposite to the third rotation direction.

2. The display apparatus according to claim 1, wherein the first housing includes a first housing wall, the opening is disposed in the first housing wall, the second reel is disposed between the first housing wall and the first reel, or the first reel is disposed between the first housing wall and the second reel; and an extending direction of the flexible support plate from the second reel to outside of the first housing is parallel to an extending direction of the flexible display panel from the first reel to the outside of the first housing, and a portion of the flexible support plate extending out of the second reel is attached to a portion of the flexible display panel extending out of the first reel.

3. The display apparatus according to claim 2, further comprising:

a first limiting member and a second limiting member that are disposed in the first housing, the first limiting member and the second limiting member having a first gap therebetween, wherein the flexible display panel and the flexible support plate pass through the first gap, and a width of the first gap is less than or equal to a sum of thicknesses of the flexible display panel and the flexible support plate.

4. The display apparatus according to claim 3, wherein the first limiting member is a first limiting roller, the second limiting member is a second limiting roller, and the first limiting roller and the second limiting roller extend in a same direction and are both rotatably arranged in the first housing.

5. The display apparatus according to claim 2, further comprising:

a third limiting member disposed in the first housing, the third limiting member and the second reel having a second gap therebetween, wherein the flexible display panel and the flexible support plate pass through the second gap, and a width of the second gap is less than or equal to a sum of thicknesses of the flexible display panel and the flexible support plate.

6. The display apparatus according to claim 5, wherein the third limiting member is a third limiting roller, and the third limiting roller is rotatably arranged in the first housing, and the third limiting roller and the second reel extend in a same direction.

7. The display apparatus according to claim 1, further comprising:

a second housing and a display driver, the display driver being disposed in the second housing and configured to drive the flexible display panel to perform display;

a second end of the flexible display panel and a second end of the flexible support plate are both connected to the second housing;

wherein the second end of the flexible display panel is an end of the flexible display panel extending out of the first housing, and the second end of the flexible support plate is an end of the flexible support plate extending out of the first housing.

8. The display apparatus according to claim 7, wherein an installation slot is provided on an outer surface of a housing wall of the second housing, in a direction in which the flexible display panel extends out or retracts relative to the first housing, an end of the installation slot proximate to the first housing has an insertion opening, and another end of the installation slot away from the first housing is sealed;

the second end of the flexible display panel and the second end of the flexible support plate extend into the installation slot through the insertion opening, and in the installation slot, a surface of the flexible support plate is adhered to a slot wall of the installation slot, and another surface is attached to the flexible display panel.

9. The display apparatus according to claim 7, further comprising:

a scissor mechanism connected between the first housing and the second housing; wherein the scissor mechanism includes a plurality of connecting rod groups arranged in a direction in which the flexible display panel extends out or retracts relative to the first housing, each connecting rod groups includes two connecting rods whose middle portions are hinged together;

in two adjacent connecting rod groups, ends of two connecting rods in one connecting rod groups proximate to another connecting rod group are hinged with ends of two connecting rods in the another connecting rod group proximate to the one connecting rod group in a one-to-one correspondence;

in a connecting rod group adjacent to the first housing, ends of two connecting rods proximate to the first housing are respectively hinged with the first housing, and an end of at least one connecting rods of the two connecting rods proximate to the first housing is configured to be capable of moving relative to the first housing in a length direction of the first reel; and in a connecting rod group adjacent to the second housing, ends of two connecting rods proximate to the second housing are respectively hinged with the second housing, and an end of at least one connecting rods of the two connecting rods proximate to the second housing is configured to be capable of moving relative to the second housing in the length direction of the first reel.

10. The display apparatus according to claim 1, wherein the flexible support plate includes a flexible support plate body and an adhesive film adhered to a surface of the flexible support plate body;

the adhesive film is configured such that when the flexible display panel and the flexible support plate extend out of the first housing through the opening, the adhesive film be capable of gradually adhering to the flexible display panel, so that the flexible support plate and the flexible display panel are attached together; peeling force between the adhesive film and the flexible display panel is smaller than peeling force between the adhesive film and the flexible support plate body.

11. The display apparatus according to claim 10, wherein the peeling force between the adhesive film and the flexible display panel is less than 3 g/inch.

12. The display apparatus according to claim 10, wherein the adhesive film is an elastic film, and/or the flexible support plate body is a steel sheet.

13. The display apparatus according to claim 1, wherein the flexible display panel includes a panel body and a flexible cover plate; a surface of the panel body facing away from a display surface thereof is configured to be attached to the flexible support plate, the flexible cover plate covers the display surface of the panel body, and an edge of the flexible cover plate exceeds an edge of the panel body in a length direction of the first reel;

the flexible display panel further includes an elastic support layer, the elastic support layer is attached to an edge of the flexible cover plate, and is configured such that when the panel body is attached to the flexible support plate, the elastic support layer is located between the edge of the flexible cover plate and the flexible support plate to support the edge of the flexible cover plate.

14. The display apparatus according to claim 13, wherein the elastic support layer is a foam layer.

15. The display apparatus according to claim 1, wherein the first housing includes a first housing wall and a third housing wall adjacent to the first housing wall, the opening is disposed in the first housing wall, the first reel and the second reel are arranged at intervals in a second direction; an extending direction of the flexible support plate from the second reel to outside of the first housing is not parallel to an extending direction of the flexible display panel from the first reel to the outside of the first housing; a dimension of the opening in the second direction matches a sum of thicknesses of the flexible support plates and the flexible display panel.

16. The display apparatus according to claim 15, wherein the dimension of the opening in the second direction is equal to the sum of the thicknesses of the flexible support plates and the flexible display panel.

17. The display apparatus according to claim 9, wherein in the connecting rod group adjacent to the first housing, the end of a connecting rods of the two connecting rods proximate to the first housing is provided with a first articulated shaft thereon, the end of another connecting rods of the two connecting rods proximate to the first housing is provided with a second articulated shaft thereon; the first housing is provided with a first sliding groove and a second sliding groove that are arranged at intervals in the length direction of the first reel therein, the first sliding groove and the second sliding groove both extend in the length direction of the first reel; the first articulated shaft extends into the first sliding groove, and is slidably engaged with the first sliding groove, the second articulated shaft extends into the second sliding groove, and is slidably engaged with the second sliding groove.

18. The display apparatus according to claim 9, wherein in the connecting rod group adjacent to the second housing, the end of a connecting rods of the two connecting rods proximate to the second housing is provided with a third articulated shaft thereon, the end of another connecting rods of the two connecting rods proximate to the second housing is provided with a fourth articulated shaft thereon; the second housing is provided with a third sliding groove and a fourth sliding groove that are arranged at intervals in the length direction of the first reel therein, the third sliding groove and the fourth sliding groove both extend in the length direction of the first reel; the third articulated shaft extends into the third sliding groove, and is slidably engaged with the third sliding groove, the fourth articulated shaft extends into the fourth sliding groove, and is slidably engaged with the fourth sliding groove.

19. A display apparatus, comprising:
a first housing provided with an opening therein;
a first reel rotatably disposed in the first housing;
a second reel rotatably disposed in the first housing, the second reel and the first reel being arranged at intervals, and extending in a same direction;
a flexible display panel, a first end of the flexible display panel being connected to the first reel and wound on the first reel; and
a flexible support plate, a first end of the flexible support plate being connected to the second reel and wound on the second reel, wherein
the flexible display panel and the flexible support plate are configured such that when the flexible display panel and the flexible support plate extend out of the first housing through the opening, the flexible support plate is capable of gradually attaching to the first housing to support the flexible display panel,
wherein the flexible display panel includes a panel body and a flexible cover plate; a surface of the panel body facing away from a display surface thereof is configured to be attached to the flexible support plate, the flexible cover plate covers the display surface of the panel body, and an edge of the flexible cover plate exceeds an edge of the panel body in a length direction of the first reel; and
the flexible display panel further includes an elastic support layer, the elastic support layer is attached to an edge of the flexible cover plate, and is configured such that when the panel body is attached to the flexible support plate, the elastic support layer is located between the edge of the flexible cover plate and the flexible support plate to support the edge of the flexible cover plate.

20. The display apparatus according to claim 19, wherein the elastic support layer is a foam layer.

* * * * *

UNITED STATES PATENT AND TRADEMARK OFFICE
CERTIFICATE OF CORRECTION

PATENT NO. : 12,111,697 B2
APPLICATION NO. : 17/781091
DATED : October 8, 2024
INVENTOR(S) : Xiaofei Luo, Shangchieh Chu and Yanyan Yang Page 1 of 1

It is certified that error appears in the above-identified patent and that said Letters Patent is hereby corrected as shown below:

In the Specification

In Column 3, Line 16, please change "the first reek" to --the first reel--
In Column 9, Line 47, please change "the rst housing 1" to --the first housing 1--
In Column 10, Line 40, please change "apply a damping" to --apply a clamping--
In Column 17, Line 5, please change "film 322 fro being separated" to --film 322 from being separated--

In the Claims

In Column 19, Line 16, Claim 1, please change "the flexible display panel" to --the flexible support plate--

Signed and Sealed this
Eleventh Day of February, 2025

Coke Morgan Stewart
*Acting Director of the United States Patent and Trademark Office*